United States Patent [19]

McKindary

[11] 4,351,210

[45] Sep. 28, 1982

[54] SHEAR CUT TOOTH

[75] Inventor: Thomas W. McKindary, Totowa, N.J.

[73] Assignee: Zimmer Manufacturing Corp., Hawthorne, N.J.

[21] Appl. No.: 176,809

[22] Filed: Aug. 11, 1980

Related U.S. Application Data

[63] Continuation-in-part of Ser. No. 962,421, Nov. 20, 1978, abandoned.

[51] Int. Cl.[3] .......... B62D 7/00

[52] U.S. Cl. .......... 83/835; 30/355; 76/107 C; 83/663

[58] Field of Search .......... 76/107 C, 107 R; 493/370, 372; 30/355, 357; 83/835, 854, 636, 663, 669, 695, 697, 678, 676, 689

[56] References Cited

U.S. PATENT DOCUMENTS

| | | | |
|---|---|---|---|
| Re. 8,646 | 4/1879 | Carruth | 83/695 |
| 154,198 | 8/1974 | Trowbridge | 30/355 X |
| 2,517,840 | 8/1950 | Chatlos | 30/355 X |
| 3,645,155 | 2/1972 | Robinson | 76/107 C |
| 3,855,892 | 12/1974 | DiLello | 76/107 C |

*Primary Examiner*—James M. Meister
*Attorney, Agent, or Firm*—W. Patrick Quast

[57] ABSTRACT

A cutting rule including teeth having a beveled chisel-like tip with a straight-edged top, symmetrical angular side edges and shallow notches between adjacent teeth. In alternate embodiments the side edges may be beveled and the rear side of the tip may be beveled. Also, an improved slot configuration is provided which facilitates bending to form a curved rule.

6 Claims, 11 Drawing Figures

SHEAR CUT TOOTH

This application is a continuation in part of application U.S. Ser. No. 962,421, filed Nov. 20, 1978 and now abandoned.

BACKGROUND OF THE INVENTION

1. Field of the Invention

The present invention pertains generally to various cutting tools such as die rule blades, slitter blades, and the like, commonly used in production line presses for cutting a stock material in bulk and more particularly to a novel cutting edge configuration using a chisel-like tooth. See Disclosure Document 054,341.

2. Description of the Prior Art

The art to which this invention pertains has been well developed in recent years. As more production lines are automated and new materials are introduced, the need for an improved cutting rule which would achieve cutting with reduced applied force, prolong the life of die cutting equipment, reduce the need for frequent cutting rule replacements and which yields cleaner cuts of the stock material has stimulated many new designs and much experimentation with cutting rule on various types of stock materials. Patents in this art include U.S. Pat. No. 3,203,295 and more recently U.S. Pat. Nos. 3,855,892; 3,961,858 and 4,002,092. The prior art in cutting rule and the problems encountered in the present art are discussed in these patents. These patents indicate trends in cutting rule design, which the present novel design continues only in part. The present invention is directed in particular to yielding a cleaner cut than possible with the die cutting rule of these patents.

U.S. Pat. No. 3,855,892 discloses a cutting blade having an asymmetric sawtooth cutting edge in which the depth of the notch is less than half the distance between the adjacent teeth tips, said teeth tips being sharply pointed. U.S. Pat. No. 3,961,858 discloses a compound angle cutting edge configuration having piercing points and slicing edges extending away from one peak downward into an adjacent notch and up to the next peak at a different angle, thus resulting in an assymmetrical configuration having shallow notches. U.S. Pat. No. 4,002,092 also shows the cutting edge of U.S. Pat. No. 3,961,858. In these patents there are three common features, an asymmetric tooth design, a sharp piercing point on the tooth and shallow notches or crotches between the teeth.

The use of a sharp, piercing tooth tends to rip the stock material at the point of penetration. The asymmetric tooth design results in a leaning tooth which, in the embodiment of U.S. Pat. No. 4,002,092, has notches which are too shallow and hence requires more press force to penetrate the stock material. In general, the trend toward shallow teeth is effective when the depth of the crotch is integrated with the tooth design because the blade does not cut until the teeth have fully penetrated the stock material.

U.S. Pat. No. 3,203,295, cited in the prosecution of the parent application teaches a rule having curved apices and valleys and not the sharp spaces or valleys as proposed herein. The radius in the valley of the tooth disclosed therein causes a less smooth cut, increased pressure to cut and an imbedding of the cut material (trapped in the rounded valleys) into the blanket material reducing the latter's life. Further, it teaches the use of slots formed in the body portion to facilitate forming of the rule, whereas the slot of the present invention has been formed to greatly facilitate the curving of the rule as best seen in FIG. 10.

After extensive experimentation with teeth designs and cutting edges, including those disclosed in the above-cited patents, the design of the present invention has evolved to solve the problems still remaining in die cutting many stock materials.

SUMMARY OF THE INVENTION

This invention pertains to a cutting die rule, both rotary and straight edge. The invention includes cutting teeth each having a small, chisel-like tip with a straight edged top, approximately 0.010 inches wide, rather than the piercing points or curvy wave shape of prior art rules. The tip is beveled on one side. It may or may not be beveled on the reverse side of the tip. If it is, the reverse side bevel may vary up to approximately 30° with a preferred range of 25° to 30°. This back bevel, it has been found, gives the teeth added strength and longer life. In a rule a plurality of such teeth are spaced apart with relatively shallow notches in between the teeth, the depth of the notch being about one-half the distance between adjacent teeth tips. The side edges of the teeth leading angularly downward to each notch may or may not be beveled on the face of the die rule. In the die rule of this invention each tooth is in effect a miniature chisel. The initial penetration of the stock material by a plurality of chisel-like teeth produces a very clean shear cut of the stock material. As the full rule penetrates the stock material, the cut becomes a continuous clean cut. The relatively blunt edge of the teeth combined with the relatively shallow notches results in a very minor penetration of the resilient back up die pad. In the cutting edge of the preferred embodiment, each tooth from notch to notch is symmetrical. Repeated experimentation has shown no significant advantage obtained by an asymmetrical design, while the disadvantage of increased press force results. Thus the shear cut tooth of the present invention is a symmetrical tooth with a chisel-like flat tip and has shallow notches between adjacent teeth. The combination of these three factors yields a clean shear with less press force, the cleaner cut having no burrs and no distortion on the edges of the cut stock material, both the sides of the cut being the same in appearance. A die rule having these teeth does not score or tear the back-up die pad, requires less pressure to cut through the stock material, can make a longer cut than other blades, and has a longer blade life.

Further, the invention discloses an improved slot configuration which, it has been found, facilitates bending of the rule by minimizing the pressure involved and reduces kinking of material as heretofore experienced.

DESCRIPTION OF THE PREFERRED EMBODIMENT

Figure 1:
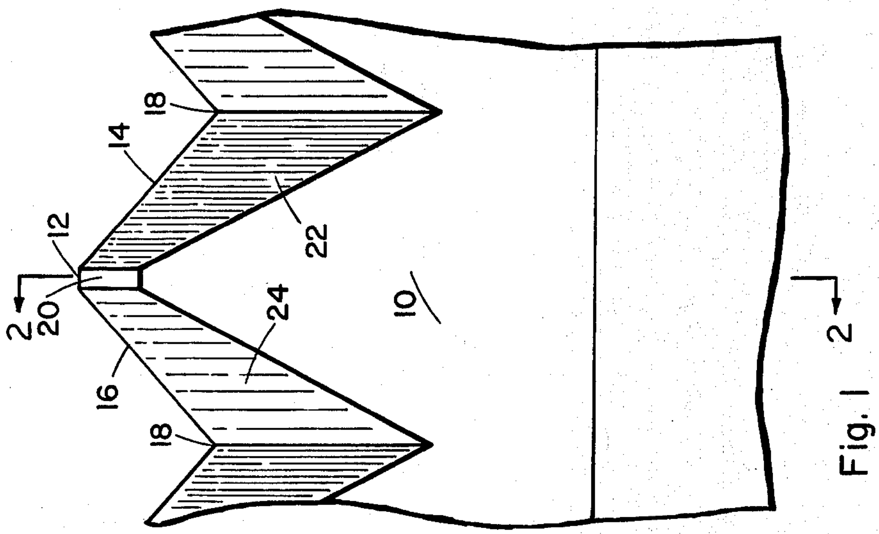
FIG. 1 is a front plan view of the shear cut tooth of an embodiment of the present invention.
Figure 4:
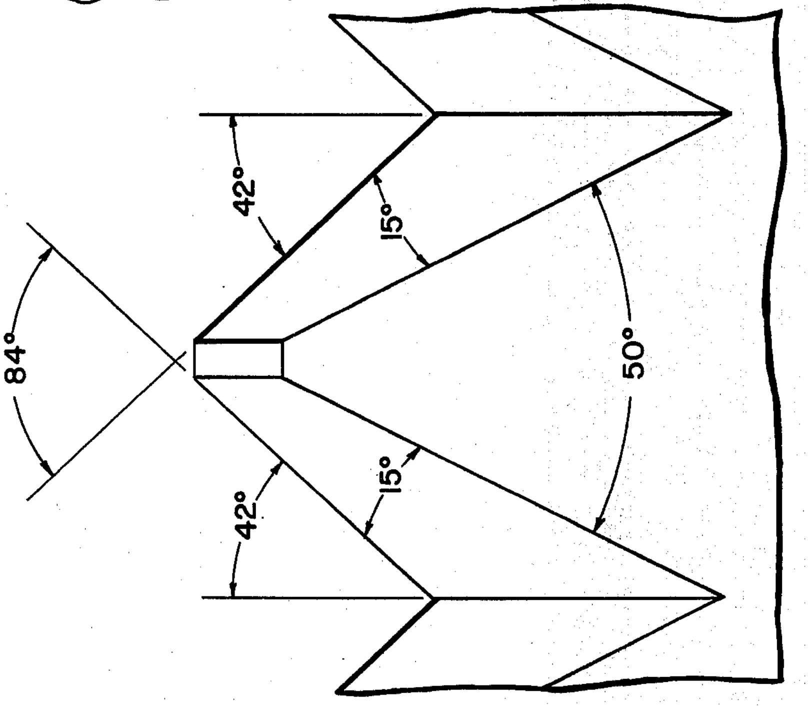
FIG. 4 is a plan view similar to FIG. 1 showing an example of relevant angles.

Referring now to the drawings, FIG. 1 is a front plan view of an embodiment of a rule, showing a shear cut tooth, designated generally by the reference number 10, designed in accordance with the teachings of the present invention. In this figure, shear cut tooth 10 for a die rule has a short, straight tip edge 12 and two side edges 14, 16 of equal length leading angularly downward from tip 12 to notches 18. Short tip edge 12 has a width of approximately 0.01 inches wide. As indicated in FIG. 4, the angle from edge 14 to a straight line vertical extension from notch 18 is 42′. In one manufactured size for cutting corrugated board the horizontal length of tip 12 is 0.010 inch. The distance from tip 12 to an adjacent tip 12 (centerline to centerline) is 0.120 inches. The depth of each notch 18 is about one-half the distance between adjacent tips 12, or 0.060 inches. These dimensions are for purpose of example only and are not meant to be limiting. Likewise, any angles illustrated and described are by way of examples only. It is to be understood that minor changes may be necessitated by the nature of the stock material to be cut and the press used for die cutting.

The front side of tip 12 may be slightly beveled inward to create a sharper cutting tip. That portion of the front of zip 12 which is beveled is indicated by the reference number 20 in FIGS. 1, 2, 3 and 6.

Figure 6:
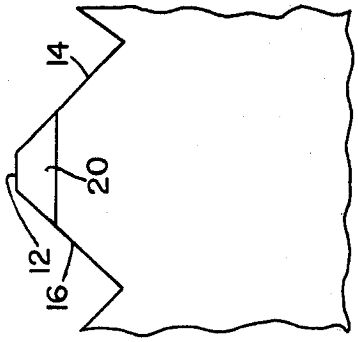
FIG. 6 is a plan view of an alternate embodiment of the invention.

The embodiment of shear cut tooth described to this point is that of FIG. 6, which is useful for many applications. Further refinements of this embodiment are shown in FIG. 1. In FIG. 1, each side edges 14, 16 of shear cut tooth 10 is beveled from tip 12 to notch 18. These beveled edges are designated by the reference numbers 22, 24. The beveling of edges 14, 16 results in a smaller tip bevel area 20, but produces a sharper side edge 14, 16 and decreases the thickness of the rule in the area around notches 18.

Figure 3:
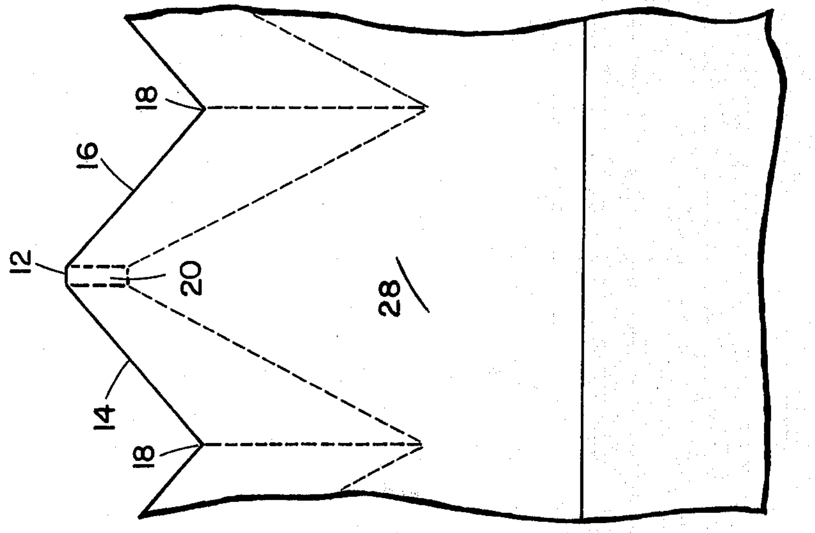
FIG. 3 is a rear plan view of the embodiment of FIG. 1.
Figure 2:
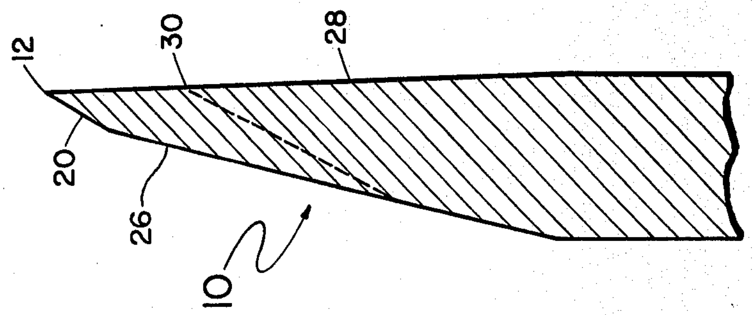
FIG. 2 is a side cross-sectional view taken along the line 2—2 of FIG. 1.

FIG. 2 is a side cross-sectional view taken along the line 2—2 of FIG. 1. Front edge 26 inclines slightly inward until it reaches the edge of beveled section 20 where it inclines at a greater angle to produce a sharp tip 12. It should be noted that rear edge 28 is generally vertical until it reaches a point 30 from which it inclines slightly inward to tip 12, the usual angle being three degrees.

In both embodiments, shear cut tooth 10 has basically a chisel-like structure. In the embodiment of FIG. 6 only the tip 12 is beveled while in the embodiment of FIG. 1 the edges 14, 16 of tooth 10 are also beveled. Extensive experimentation has shown that the short, flat-edged tip 12 is more effective for clean penetration of stock material than a piercing point tip which tends to rip the material and cause jagged edges. The combination of a flat-edged, chisel-like tip 12, symmetrical side edges 14, 16 and relatively shallow notches 18 yields a more effective tooth design for die cut rule than heretofore available.

Figure 5:
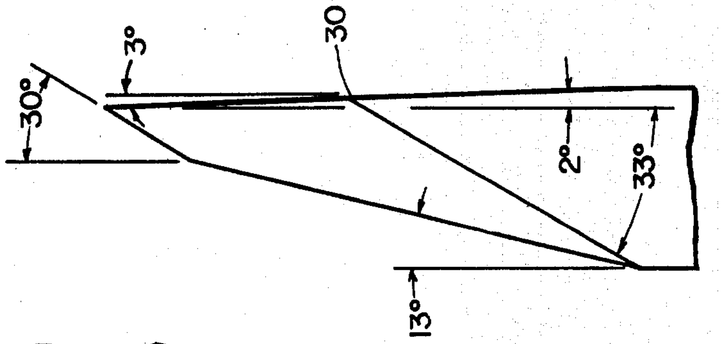
FIG. 5 is a side cross-sectional view showing an example of relevant angles.

FIG. 4 is a plan view of the embodiment of FIG. 1 and FIG. 5 is a side cross-sectional view of the various embodiments illustrating some typical angles used in the manufacture of the die cut rule of the present invention. However, as stated previously, these are shown for purposes of illustration only and are not intended to be limiting in any way.

Referring now to FIGS. 7–11, there is depicted in various views, a further embodiment of the basic invention described herein. Applicant considers this to be a preferred embodiment for most applications. This particular version of the cutting rule, 50, includes cutting teeth portion 52 similar in construction and design to that described above. The teeth are formed along one edge of the body portion of the rule 54. The latter includes keyhole-shaped slots 56 which are disposed along the opposite edge of the rule and cut through the body portion thereof at a spacing of approximately ½ inch. The improved slot configuration enables the rule to be bent in a circular fashion such as FIG. 11 with less pressure and kinking of the material.

Figure 9:
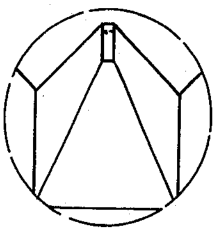
FIGS. 9 and 10 are enlarged views of the circled areas of FIGS. 6 and 7 respectively.
Figure 10:
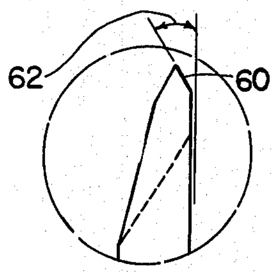
Figure 7:
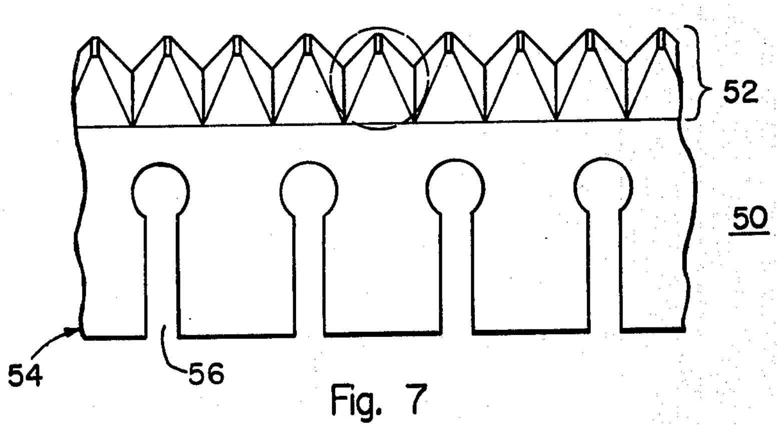
FIG. 7 is a front plan view of another embodiment of the present invention showing another feature.
Figure 8:
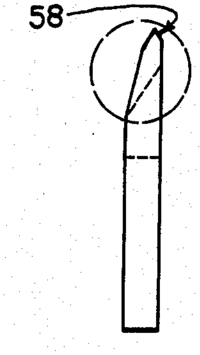
FIG. 8 is a side elevational view of the embodiment of FIG. 6 showing a second feature thereof.
Figure 11:
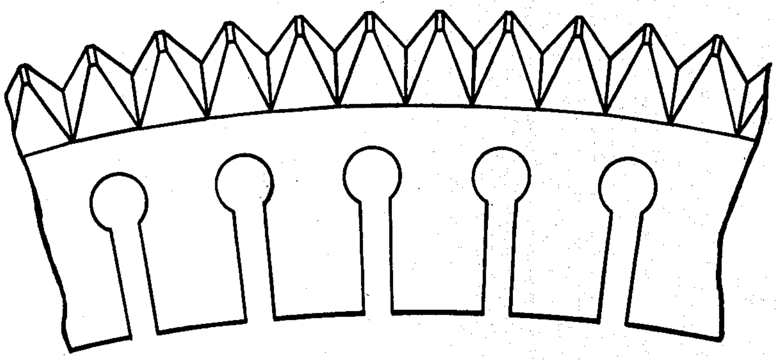
FIG. 11 is a front plan view showing a curved embodiment of the present invention.

FIG. 8, an end-view profile of the rule 50, and the enlarged drawing, FIG. 9, depicting the tooth area of this further embodiment, shows that the chisel portion of the tooth 58 includes a more sharply cut bevel 60 on the back surface. Experimentation has led to a cut resulting in a bevel angle 62 falling between 25°–30°. Test results have indicated that such an angle gives added strength to the teeth resulting in longer life.

Other embodiments of the Cutting Rule will occur to those skilled in the art in view of the above. The described embodiments are not considered to be a limitation on the present invention, the breadth of which is limited only by the appended claims.

What is claimed is:

1. A cutting rule of a general type having an elongated flat body portion with teeth formed along at least one edge thereof and comprising:

a plurality of teeth spaced apart along at least one edge of said cutting rule, the rear side of said rule having a slightly beveled first surface;

each tooth having a tip with a straight edge for piercing stock material, said straight edge being about one-twelfth the space between adjacent tooth tips;

each tooth having first and second tooth edges diverging from one another and extending angularly from each side of said tip toward the body portion of said rule, said edges terminating at notches formed by the points of intersection with side edges of adjacent teeth;

said first and second edges of adjacent teeth intersecting a datum line at the same angle such that each tooth is symmetrical in shape, said notches being distant from an imaginary line along the longitudinal tip edge of said rule about one-half the distance between adjacent teeth;

said tooth tips having a second beveled surface, said second surface being beveled angularly from the front of said rule toward the rear of said rule such that said tips have a chisel-like structure; said rear side of each of said tooth tips each having a slightly beveled third surface, said third surface being beveled angularly from said tip straight edge downward towards the rear side of said rule.

2. The cutting rule claimed in claim 1 wherein the sides of each tooth are beveled from said side edges inwardly, thereby forming sharp side edges for piercing stock material.

3. The cutting rule claimed in either claims 1 or 2 wherein the straight edge of each said tooth tip is 0.010 inches wide, the distance between said teeth is 0.120 inches and the depth of said notches is 0.060 inches.

4. The cutting rule claimed in either claims 1 or 2 wherein said third surface bevel is approximately 30°.

5. The cutting rule claimed in either claims 1 or 2 wherein said third surface bevel angle is in the range of 25° to 30°.

6. The cutting rule claimed in claims 1 or 2 further comprising a plurality of key-hole shaped slots disposed at predetermined intervals along the edge opposite the teeth bearing edge.

* * * * *